UNITED STATES PATENT OFFICE.

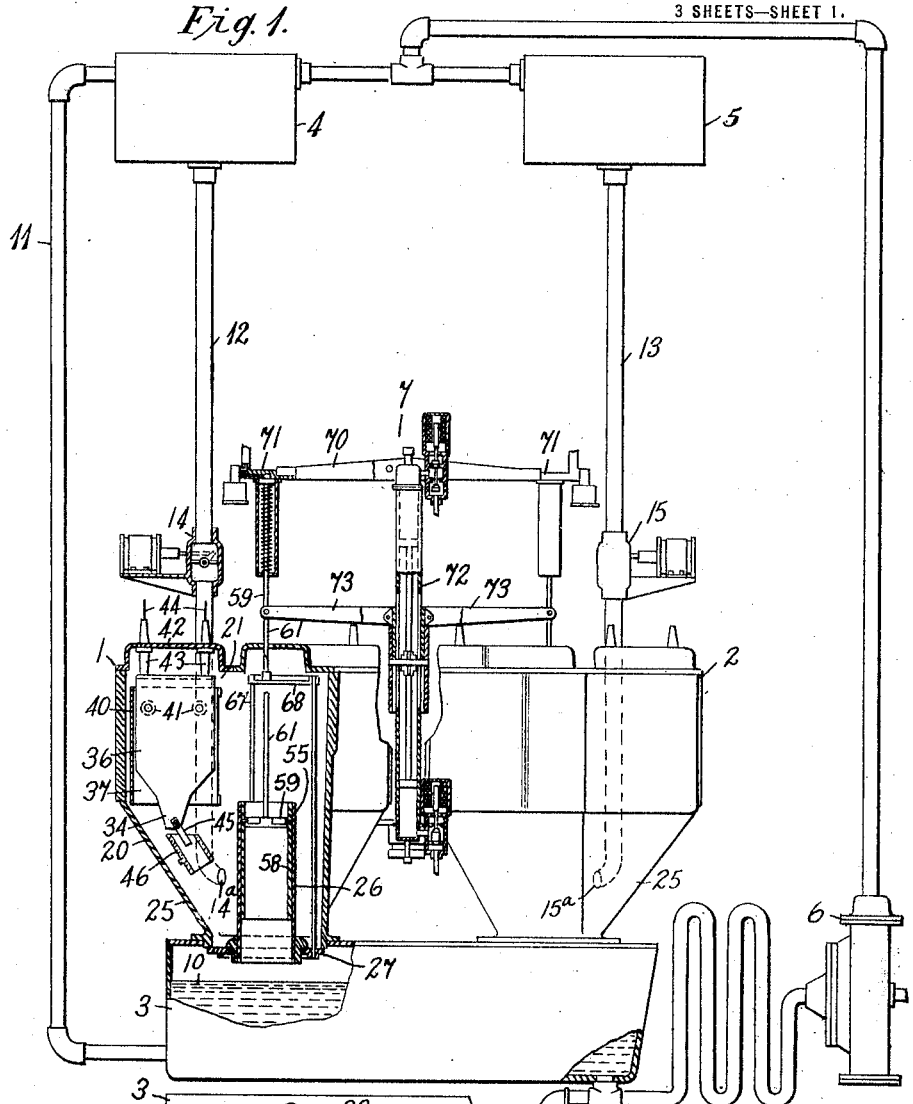
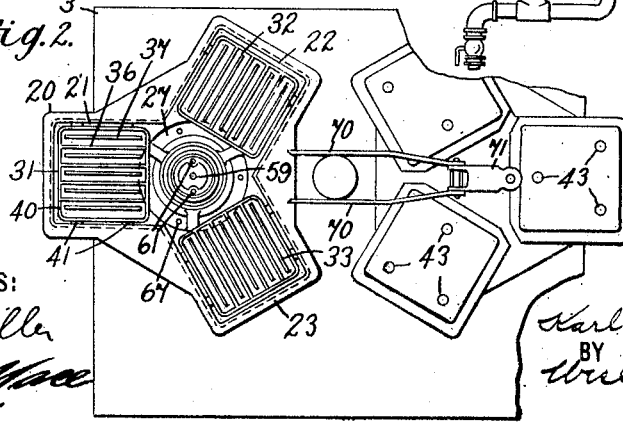

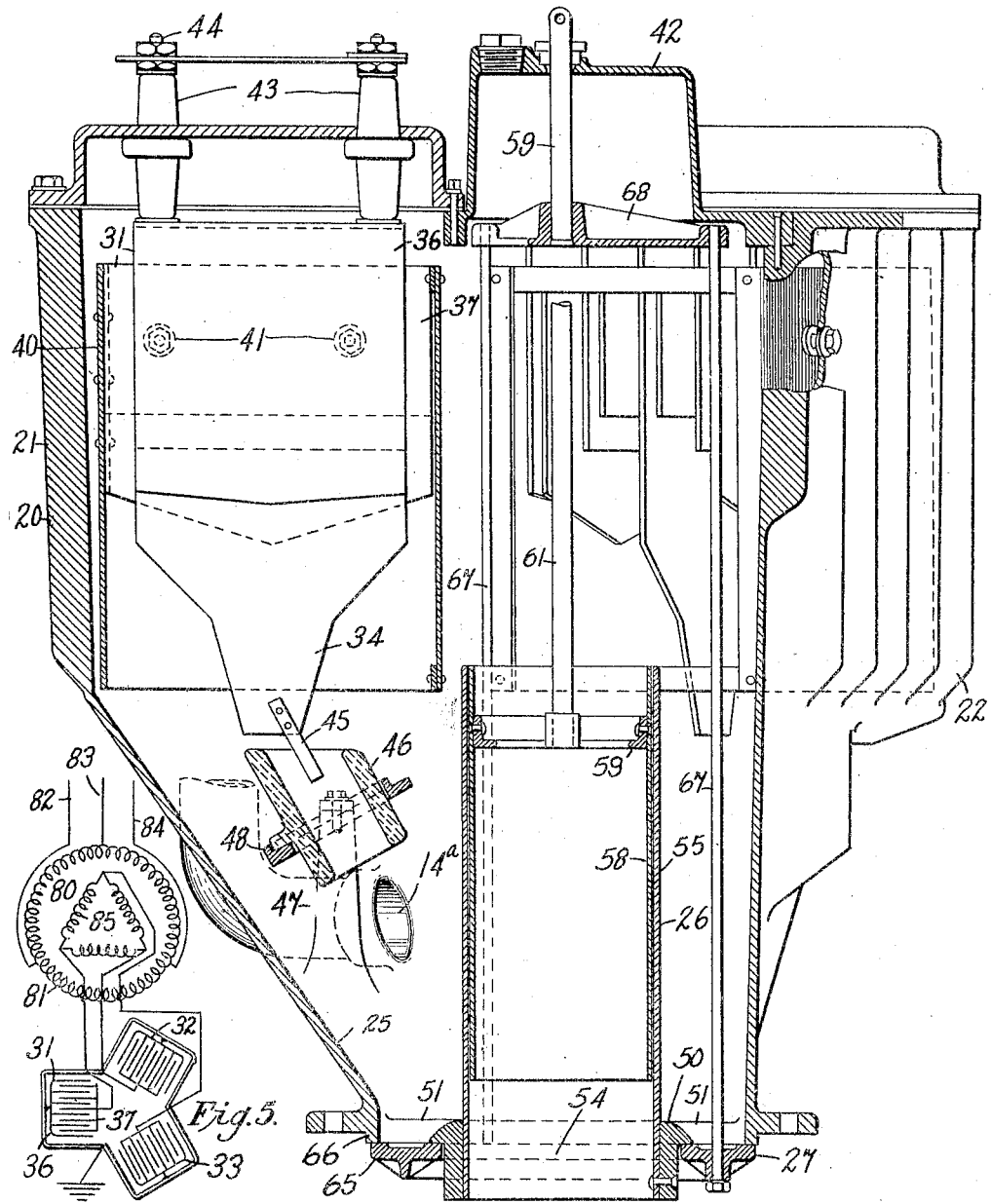

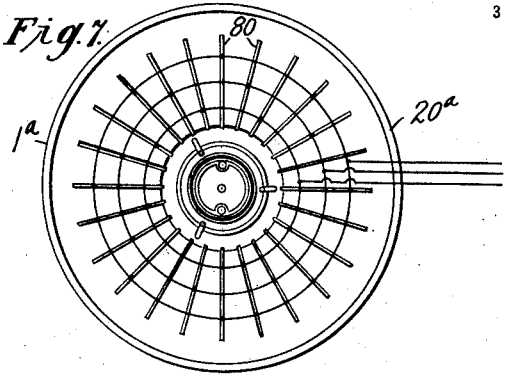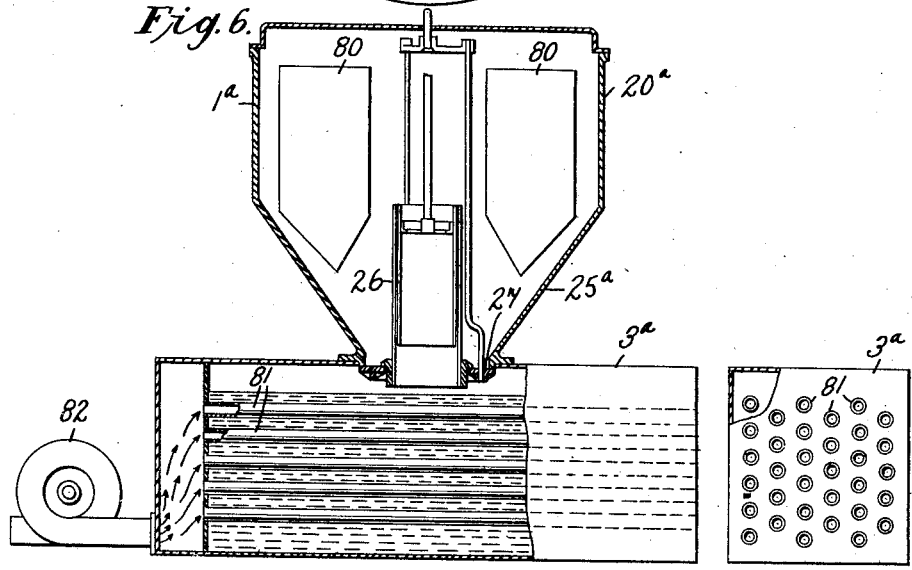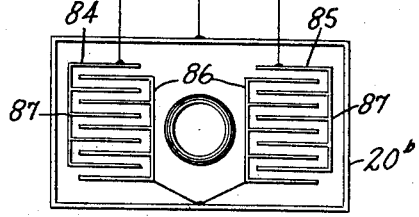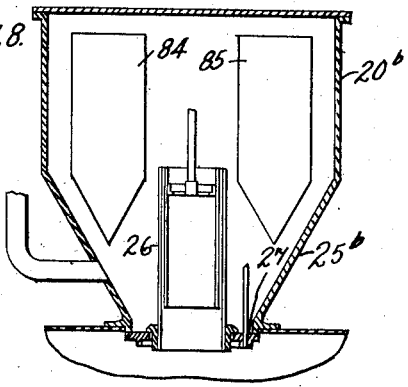

KARL A. SIMMON, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,321,483.     Specification of Letters Patent.     Patented Nov. 11, 1919.

Application filed April 4, 1914. Serial No. 829,419.

*To all whom it may concern:*

Be it known that I, KARL A. SIMMON, a citizen of the United States, and a resident of Wilkinsburg, in the county of Allegheny and State of Pennsylvania, have invented a new and useful Improvement in Control Apparatus, of which the following is a specification.

My invention relates to control apparatus, and particularly to liquid rheostats such as are commonly employed for the control of polyphase induction motors.

One of the objects of my invention is to provide a liquid rheostat which, by reason of its lightness and compactness, is peculiarly adapted for use upon electric locomotives or other vehicles while economy of space and weight are necessary.

Another object of my invention is to provide a simple and inexpensive apparatus of the character above indicated through which a circulation of electrolyte is effected and which embodies means for readily fixing the height of the electrolyte and for effecting a sudden discharge thereof.

Another object of my invention is to provide a polyphase liquid rheostat having a plurality of sets of coöperating electrodes, and to make provision for a continuous circulation of electrolyte up through the various elctrodes and out through a common centrally disposed discharge opening, whereby the heat dissipated by the electrodes and given up to the electrolyte is continuously carried away.

A still further object of my invention is to provide a polyphase liquid rheostat in which the several sets of electrodes are connected in star relation, which facilitates the insulation of the various parts, if the rheostat tank is grounded, and reduces the potential of said parts above that of the ground.

In the accompanying drawing, Figure 1 is a view, partially in section and partially in elevation, of apparatus constructed in accordance with my invention, and Fig. 2 is a plan view of a portion of the apparatus shown in Fig. 1, the cover of one of the rheostats being removed to show the disposition of the electrodes and the central valves. Fig. 3 is an enlarged view, partially in section and partially in side elevation, of one of the rheostats shown in Fig. 1, Fig. 4 is a plan view of the lower portion of the tank structure, and Fig. 5 is a diagrammatic view of the circuit connections of a polyphase induction motor and its associated rheostat. Figs. 6 and 7 are, respectively, a view, partially in section and partially in side elevation, and a plan view of a modified form of my invention, and Figs. 8 and 9 are, respectively, a view, partially in section and partially in elevation, and a plan view of a further modification of my invention.

Referring to the drawing, the apparatus shown comprises a plurality of polyphase liquid rheostats 1 and 2, a common receiving tank 3, a plurality of auxiliary reservoirs 4 and 5, a pump 6 and associated piping, and a common operating mechanism 7 for governing the operation of the associated liquid rheostats 1 and 2.

The tank 3 supports the rheostats 1 and 2 and contains a body of electrolyte 10 which is raised and delivered to the auxiliary reservoirs 4 and 5 by means of the pump 6. The pump 6 may be of any construction and is preferably operated continuously under a constant load, an overflow pipe 11 being provided between the auxiliary reservoirs 4 and 5 and the receiving tank 3 to dispose of the excess of electrolyte after said reservoirs are filled. The reservoirs 4 and 5 are respectively connected to rheostats 1 and 2 by means of pipes 12 and 13 which are provided with suitable valves 14 and 15 to be operated in any suitable manner for controlling the admission of electrolyte into the rheostats 1 and 2.

The liquid rheostats 1 and 2 are of like construction, and each comprises essentially a single containing tank 20 having a plurality of compartments 21, 22 and 23, and a tapered lower portion 25, the bottom of which is provided with a regulatable telescopic valve 26 for fixing the height or level of the electrolyte within the tank 20, and an independently operated valve 27 for effecting a quick discharge of the electrolyte.

A plurality of sets of electrodes 31, 32 and 33 are severally disposed within the respective compartments 21, 22 and 23 of the tank 20, and each set comprises two groups of electrodes 36 and 37, which are disposed in proximity of one another in alternate arrangement. The groups of electrodes 36 are secured to a channel shaped supporting member 40 which has its open side adjacent to the central valve 26, and this channel shaped member or open-sided box-like structure 40 is supported by the tank 20 and electrically connected thereto by means of members 41. If desired, the member 40 may be omitted and the electrodes 36 be fastened directly to the tank 20 or cast integrally therewith.

The other groups of electrodes 37 are supported by and insulated from the tank cover 42 by a plurality of insulating bushings 43 having conductors 44 which are electrically connected to the groups of the electrodes 37. One of the electrodes constituting each group 36 is provided with a tapered portion 34 which projects somewhat below the other electrodes and is provided with an inclined conducting member 45 that projects into an inclined insulating bushing 46 which is suitably supported within the tank 20 by an integral member 47 and a ring 48.

The tapered lower portion 25 of the tank 20 is provided with a centrally disposed annular member 50 which is supported in position by means of a plurality of integral webs 51, thus providing a series of openings 52 which constitute, except for the webs 51, an annular discharge opening. Within the annular member is a circular opening 54 that constitutes the overflow opening with which the regulatable valve 26 is associated.

The adjustable valve 26 is substantially telescopic in form and embodies a stationary tubular member 55, the lower end of which is secured to the inner side of the annular member 50 in a suitable manner. The tubular member 55 projects upwardly in the center of the tank 20 and intermediate the several compartments 21, 22 and 23. Moreover, the top of the member 55 is slightly higher than the lower portion of certain of the electrodes, for a purpose to be hereinafter set forth. A tubular member 58 coöperates with the member 55 and, as shown, is disposed within it and adapted to be raised and lowered in position, although the movable member 58 may, of course, surround the stationary member 55, if desired. The movable member 58 is attached to a ring 59 that is suitably fastened to a plurality of operating rods 61 which project upwardly through the cover 42 of the tank 20 and are operatively connected to the operating mechanism 7.

A movable annular valve member 65 coöperates with the lower portion of the annular member 50 and the outer edge 66 of the tank 20 for the purpose of closing the several openings 52 which constitute the discharge opening when the valve 65 is in its lowered position. The member 65 is suspended, by means of rods 67, from a yoke 68 which is carried by a supporting member 69 that projects through the cover 42 and is mechanically associated with the operating mechanism 7.

The operating mechanism 7 comprises stationary supporting arms 70, the ends of which support electro-pneumatic operating devices 71 which serve to actuate the rods 69 and their associated discharge valve members 65. Another electrically controlled pneumatic operating device 72 is disposed between the liquid rheostats 1 and 2 and is adapted to raise and lower the arms 73, the ends of which carry the rods 61 and their associated movable valve members 58. No further detailed description of the operating mechanism 7 is deemed necessary, because it forms no part of my present invention, except as it performs necessary functions in the operation of the rheostats. Any suitable means for operating the movable valve members may be employed.

Referring to Fig. 5, a polyphase induction motor 80 has its primary winding 81 connected to supply circuits 82, 83 and 84, and its secondary winding 85 is connected to the sets of coöperating electrodes 31, 32 and 33 which constitute parts of a liquid rheostat embodying my invention. The groups of electrodes 37 to which the secondary motor circuits are connected, are insulated from the rheostat tank, while the groups 36 are electrically interconnected through the tank itself. Thus, the rheostat resistance between the coöperating groups of electrodes is connected in star relation, which facilitates the insulating problem, in case the rheostat tank is grounded, and materially reduces the voltage between the live parts and grounded tank, below that which would exist if the rheostat electrodes were connected in delta relation, as is the common practice.

Assuming the various parts of the apparatus to occupy the positions shown, the operation of the apparatus is as follows: First, the inlet valves 14 and 15 are opened to admit electrolyte into the several rheostats 1 and 2 through inlet ports 14$^a$ and 15$^a$. The electrolyte rapidly rises in the tanks 20, by reason of the tapered configuration thereof, and immerses the lower ends 34 of the electrodes, the height of the electrolyte being maintained at the level which corresponds to the upper end of the overflow valves 26, and which is termed the "flush level". A continuous circulation of electrolyte is effected, and the excess thereof is carried away through the telescopic outlet valves 26 and is returned to the receiving tank 3.

As soon as the electrolyte bridges the gaps between the coöperating groups of electrodes 36 and 37, the motors are started into operation in the usual manner. In order to increase the speed of the motors, the electrically controlled pneumatic operating device 72 is caused to gradually raise the associated arms 73 and movable members 58. Thus the height of the electrolyte within the tanks is correspondingly raised and may be fixed at any desired height by arresting the movement of the regulatable outlet valves 26 at that height. In this manner the rheostats may be filled with electrolyte and the level thereof be raised, either gradually throughout the operation or in a series of steps under the control of the operator.

It will be seen that the electrolyte is admitted near the bottom of the rheostats and rises through the several compartments 21, 22 and 23 in contact with the several sets of electrodes, and thence flows inwardly from the upper surface of the electrolyte, and is carried away through the overflow valves 26. Hence, a continuous circulation is established which disposes of the hot electrolyte adjacent to the electrodes.

If it is desired to lower the motor speed, it is only necessary to move the valve members 58 downwardly to a level which corresponds to the operating speed desired.

In order to discharge the electrolyte from the rheostats, the electrically controlled pneumatic devices 71 are caused to lower their respective discharge valve members 65, thereby uncovering the discharge openings 52 in the bottom of the tanks 20 and allowing the rheostats to be suddenly emptied by the discharge of electrolyte into the receiving tank 3. Thus, the secondary circuits of the driving motors are interrupted and the motors brought to rest.

To start the motors, the operating devices 71 are employed to raise the movable valve members 65 to close the discharge openings 52, after which the apparatus may be manipulated in the manner hereinbefore set forth to cause the rheostats to be filled with electrolyte and to govern the motor operation.

Reference may now be had to Figs. 6 and 7, in which a liquid rheostat 1ª comprises a substantially cylindrical tank 20ª which is provided with a tapered or cone-shaped lower portion 25ª. A discharge valve 27 and a regulating valve 26, similar to those hereinbefore described, are provided and associated with the tank 20ª and a plurality of electrodes 80 are radially disposed within the tank 20ª and are electrically connected in delta relation, as shown clearly in Fig. 7.

The rheostat tank 20ª is supported upon a main receiving reservoir 3ª that is provided with a plurality of pipes 81 which project longitudinally through the reservoir and are adapted to conduct a cooling medium, such as air, which is circulated therethrough by means of suitable blower or fan 82. Thus, the hot electrolyte which is discharged into the reservoir 3ª is caused to dissipate its heat to the cooling fluid, whereby the electrolyte is maintained at workable temperatures.

Referring now to Figs. 8 and 9, the rheostat comprises a rectangular tank 20ᵇ having a tapered lower portion 25ᵇ and is provided with a regulating valve 26 and a discharge valve 27, as hereinbefore set forth in connection with the other types of rheostats described.

In this structure, however, only two sets 84 and 85 of coöperating groups of electrodes are employed, and each set comprises a group of electrodes 86 which are electrically connected to the tank 20ᵇ and a coöperating group of electrodes 87 which are disposed adjacent thereto and are insulated from the tank 20ᵇ. The groups of electrodes 87 are independently connected to supply circuit conductors 89 and 90 of a three-phase supply circuit, while the other supply circuit conductor 91 is connected to the tank itself and hence to the groups of electrodes 86. Thus, the sets of electrodes are connected in V relation, which may be found desirable under certain operating conditions.

Obviously, various other modifications in the structural details and arrangement and location of parts may be effected without departing from the spirit and scope of my invention and, I desire that only such limitations shall be imposed as are indicated in the appended claims.

I claim as my invention:

1. A liquid rheostat comprising a tank having a plurality of compartments and a discharge opening, said tank adapted to contain a body of electrolyte, a set of parallel electrodes disposed in each of said compartments, the intermediate electrodes of each set being disposed substantially radially with reference to said opening, a tubular valve located in said opening for fixing the level of the electrolyte and discharging the excess thereof, and an inlet pipe for the electrolyte located above said opening.

2. A liquid rheostat comprising a plural-compartment tank for containing electrolyte and having a single discharge opening, a plurality of electrodes disposed in the compartments, means for effecting a continuous circulation of electrolyte through said rheostat, and a single valve member located in said opening for maintaining the level of the electrolyte at any desired height.

3. A liquid rheostat comprising a tank for containing electrolyte, a plurality of electrodes disposed therein, and concentric means for respectively fixing the level of the electrolyte and discharging said electrolyte.

4. A liquid rheostat comprising a tank for containing electrolyte, a plurality of electrodes disposed therein, adjustable tubular means for fixing the level of the electrolyte, and annular means in concentric relation therewith for discharging the electrolyte.

5. A liquid rheostat embodying a tank for containing electrolyte and a plurality of electrodes disposed therein, said tank being tapered below said electrodes for effecting a quick rise of electrolyte into contact with said electrodes.

6. A liquid rheostat embodying a tank for containing electrolyte, electrodes disposed in said tank, means for admitting electrolyte to said tank at a constant rate, and means constituting a part of said tank for causing the admitted electrolyte to rise in said tank at a plurality of rates.

7. A liquid rheostat comprising a single tank for containing electrolyte and having a plurality of compartments, coöperating electrodes disposed in each of said compartments, and means for causing a continuous circulation of electrolyte up through the several compartments in contact with the several electrodes and out through a common central discharge outlet.

8. A liquid rheostat comprising a single tank for containing electrolyte and having a plurality of compartments, coöperating electrodes disposed in each of said compartments, means for admitting electrolyte at the bottom of said tank, and common means above said admitting means for discharging said electrolyte, whereby the electrolyte rises through the several compartments in contact with the electrodes and is carried away through said common discharge means.

9. A liquid rheostat comprising a single tank for containing electrolyte and having a plurality of compartments, coöperating electrodes disposed in each of said compartments, and means for causing the electrolyte to rise through said compartments and to discharge intermediate said compartments.

10. A liquid rheostat comprising a single tank for containing electrolyte and having a plurality of compartments, coöperating electrodes disposed in each of said compartments, and an adjustable tubular valve centrally disposed within said tank and having its top edge adapted to fix the liquid level.

11. A liquid rheostat comprising a single tank for containing electrolyte and having a plurality of compartments, coöperating electrodes disposed in each of said compartments, means for admitting electrolyte to said tank, and independently operated means disposed intermediate said compartments for fixing the level of the electrolyte in said compartments and for discharging electrolyte from said tank.

12. A liquid rheostat comprising a tank for containing electrolyte and having a plurality of compartments, a plurality of electrodes severally disposed in each compartment and secured to the walls thereof, a plurality of coöperating electrodes severally disposed adjacent to the first electrodes and insulated from said tank, and means for effecting a continuous circulation of electrolyte through said tank in contact with said electrodes.

13. A liquid rheostat comprising a tank for containing electrolyte and having a plurality of compartments, a plurality of electrodes severally disposed in each compartment and secured to the walls thereof, a plurality of coöperating electrodes severally disposed adjacent to the first electrodes and insulated from said tank, and a plurality of independently operated coaxially disposed valves for respectively fixing the level of the electrolyte and discharging said electrolyte.

14. A liquid rheostat comprising a tank for containing electrolyte and having a plurality of compartments and a tapered lower portion, coöperating electrodes disposed in each of said compartments, and adjustable means associated with the bottom of said tapered portion and disposed intermediate said compartments for fixing the level of the electrolyte and serving as an overflow port.

15. A liquid rheostat comprising a tank for containing electrolyte, a plurality of electrodes in the outer portions of said tank, and means for effecting a circulation of electrolyte upward through said electrodes and downward through the central portion of said tank.

16. A liquid rheostat comprising a tank for containing electrolyte, a plurality of electrodes in the outer portions of said tank, means for admitting electrolyte into the lower portion of said tank, and centrally disposed means for discharging electrolyte, whereby a continuous circulation of electrolyte carries away the heat dissipated from said electrodes.

17. A liquid rheostat comprising a tank for containing electrolyte and having a plurality of compartments, a channel-shaped supporting frame having electrodes associated therewith in each compartment, coöperating electrodes disposed within said frames and insulated from the frame electrodes, a centrally disposed adjustable overflow valve located adjacent to the open sides of the several channel-shaped frames, and means for admitting electrolyte into the bottom of said tank.

18. The combination with a liquid rheostat tank, of a plurality of sets of adjacently disposed groups of coöperating electrodes disposed therein, one group of each set being electrically connected to the tank and the other groups being insulated therefrom and from each other.

19. A liquid rheostat comprising an electrolyte-containing tank having a bottom opening, means for effecting a continuous flow of electrolyte through the tank, and tubular valve means associated with said opening and having different diameters for fixing the electrolyte level and for quickly discharging the electrolyte.

In testimony whereof, I have hereunto subscribed my name this 30th day of March, 1914.

KARL A. SIMMON.

Witnesses:
EARL M. BILL,
B. B. HINES.

Copies of this patent may be obtained for five cents each, by addressing the "Commissioner of Patents, Washington, D. C."